(No Model.)
T. R. COON.
TRANSPLANTING IMPLEMENT.
No. 383,629. Patented May 29, 1888.
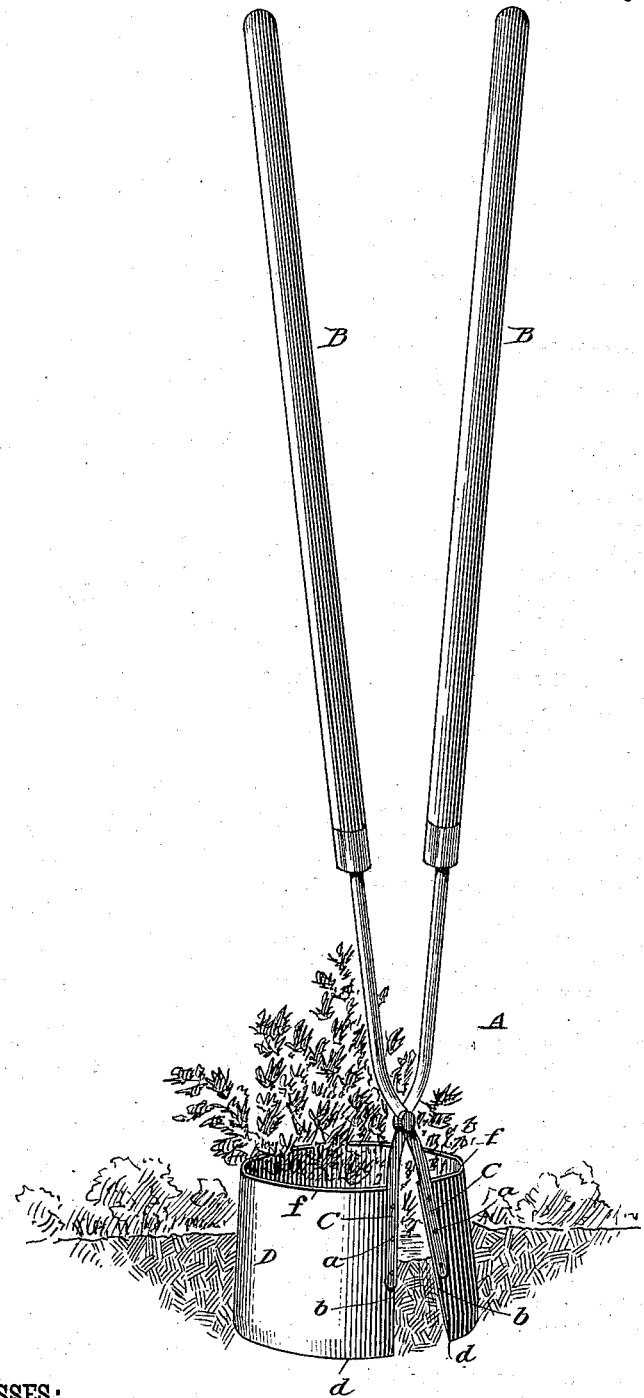

UNITED STATES PATENT OFFICE.

THOMAS RAY COON, OF HOOD RIVER, OREGON.

TRANSPLANTING IMPLEMENT.

SPECIFICATION forming part of Letters Patent No. 383,629, dated May 29, 1888.

Application filed October 25, 1887. Serial No. 253,319. (No model.)

*To all whom it may concern:*

Be it known that I, THOMAS RAY COON, of Hood River, in the county of Wasco and State of Oregon, have invented a new and Improved Transplanting Implement, of which the following is a full, clear, and exact description.

The object of the present invention is to provide a simple and easily-manipulated implement by the use of which plants may be removed from the ground with their roots intact and undisturbed, and by which holes may be also made in the ground for the reception of plants; and the invention consists in the combining with the jaws of a tongs of any suitable construction an earth-cutting blade of annular or circular band form, which is adapted to be widened and contracted under the action of the tongs, all substantially as will hereinafter appear.

Reference is to be had to the accompanying drawing, forming a part of this specification, in which the figure is a perspective view of the transplanting implement.

The tongs A are arranged so that their handles B, when closed, will close the inner jaws, C, to which, by rivets *a* or otherwise, are attached the end portions, *b*, of the blade D, which is formed of a band or strip of spring-steel, &c., beveled or sharpened at its lower edge, *d*, and bent around into ring form, as shown, and preferably with its upper edge, *f*, more contracted or embracing a smaller circle than its lower edge, *d*, as shown, the opening within such cylindrical or slightly cone-shaped blade being enlarged or contracted as the jaws C are opened or closed.

To remove a growing plant, the implement, with its blade in its wider or opened position, is forced into the earth around the roots of the plant, and through the movement of its tong-handles, then contracted or drawn, the blade is made to bind upon the earth embraced therein, whereby on its withdrawal the plant, with a clod of earth about its roots, is removed from the ground and may be carried to and placed or forced within a hole formed for the reception thereof by the implement or otherwise, the space within the blade being greater at its outer than at its inner end, permitting the earth to easily be released from the grip of the implement on its being opened; and, again, in certain kinds of soil a practical use of the instrument consists in first contracting the blade, then forcing same into the earth around and about the roots of the plant, the nature of the soil causing the portion inclosed by the blade to remain therein with the plant, so that it can be withdrawn and will not be released until the blade is spread by opening the tong-handles.

Having thus described my invention, what I claim as new, and desire to secure by Letters Patent, is—

An improved transplanter consisting of the blade D, formed of a spring-band having a sharpened lower edge, and the pivoted handles B, having their end portions secured to the end portions, *b*, of the blade, substantially as herein shown and described.

THOMAS RAY COON.

Witnesses:
JOSEPH ALEXANDER WILSON,
JACOB HELMIT VANASSELT.